US010163187B2

(12) United States Patent
Soupikov et al.

(10) Patent No.: US 10,163,187 B2
(45) Date of Patent: Dec. 25, 2018

(54) GRAPHICS RENDERING USING A HIERARCHICAL ACCELERATION STRUCTURE

(75) Inventors: Alexei Soupikov, Novgorod (RU); Maxim Y. Shevtsov, Novgorod (RU); Alexander V. Reshetov, Saratoga, CA (US)

(73) Assignee: Intel Corproation, Santa Clara, CA (US)

( * ) Notice: Subject to any disclaimer, the term of this patent is extended or adjusted under 35 U.S.C. 154(b) by 482 days.

(21) Appl. No.: 13/505,007

(22) PCT Filed: Oct. 30, 2009

(86) PCT No.: PCT/RU2009/000594
§ 371 (c)(1),
(2), (4) Date: Jul. 17, 2012

(87) PCT Pub. No.: WO2011/053181
PCT Pub. Date: May 5, 2011

(65) Prior Publication Data
US 2012/0268483 A1 Oct. 25, 2012

(51) Int. Cl.
*G06T 1/60* (2006.01)
*G06T 15/06* (2011.01)
*G06T 17/00* (2006.01)

(52) U.S. Cl.
CPC .............. *G06T 1/60* (2013.01); *G06T 15/06* (2013.01); *G06T 17/005* (2013.01); *G06T 2210/32* (2013.01)

(58) Field of Classification Search
CPC ......... G06F 17/30619; G06F 17/30625; G06F 17/30321; G06F 17/30327; G06F 17/30961; G06F 2207/22; G06F 2207/222
See application file for complete search history.

(56) References Cited

U.S. PATENT DOCUMENTS

| 6,349,380 B1 * | 2/2002 | Shahidzadeh ........... G06F 9/342 711/205 |
| 6,499,095 B1 * | 12/2002 | Sexton .................. G06F 9/4493 711/203 |
| 6,560,694 B1 * | 5/2003 | McGrath ............. G06F 9/30185 711/208 |
| 6,687,806 B1 * | 2/2004 | McGrath ............. G06F 9/30167 712/200 |

(Continued)

FOREIGN PATENT DOCUMENTS

| CN | 1928871 A | 3/2007 |
| JP | 7296145 | 11/1995 |

(Continued)

OTHER PUBLICATIONS

Realtime Ray Tracing and Interactive Global Illumination, Wald, 2004, pp. 1-297.*

(Continued)

*Primary Examiner* — Phong Nguyen
(74) *Attorney, Agent, or Firm* — Trop Pruner & Hu, P.C.

(57) ABSTRACT

A hierarchical acceleration structure may be built for graphics processing using a 32 bit format. In one embodiment, the acceleration structure may be a k-d tree, but other acceleration structures may be used as well. 64 bit offsets are only used when 64 bit offsets are needed.

26 Claims, 4 Drawing Sheets

(56) References Cited

U.S. PATENT DOCUMENTS

| | | | | |
|---|---|---|---|---|
| 6,725,366 | B1* | 4/2004 | Swanberg | G06F 9/322 711/220 |
| 7,209,587 | B1 | 4/2007 | Hsu | |
| 7,231,507 | B2* | 6/2007 | Seal | G06F 9/30043 711/220 |
| 8,400,447 | B1* | 3/2013 | Carr | G06T 17/005 345/419 |
| 2003/0196077 | A1* | 10/2003 | Henry | G06F 9/30185 712/245 |
| 2008/0192050 | A1* | 8/2008 | Schardt | G06T 15/06 345/421 |
| 2008/0244210 | A1* | 10/2008 | Vingralek | G06F 3/061 711/170 |
| 2009/0157997 | A1* | 6/2009 | Leonenko | G06F 17/30961 711/171 |
| 2009/0167763 | A1* | 7/2009 | Waechter | G06T 15/06 345/426 |
| 2010/0060634 | A1* | 3/2010 | Wald | G06T 15/06 345/420 |
| 2010/0228781 | A1* | 9/2010 | Fowler | G06T 11/40 707/791 |
| 2010/0239185 | A1* | 9/2010 | Fowler | G06T 15/06 382/291 |
| 2011/0080403 | A1* | 4/2011 | Ernst | G06T 15/06 345/420 |
| 2012/0075319 | A1* | 3/2012 | Dally | G06F 12/0284 345/537 |

FOREIGN PATENT DOCUMENTS

| | | |
|---|---|---|
| RU | 2002131793 | 5/2004 |
| RU | 2263947 | 11/2005 |

OTHER PUBLICATIONS

Stackless KD-Tree Traversal for High Performance GPU Ray Tracing, Popov et al., 2007, pp. 415-424.*

Foley et al., "KD-Tree Acceleration Structures for a GPU Raytracer", 2005, Graphics Hardware 2005, Jul. 30-31, 2005, pp. 15- 22.*

Woop et al., "B-KD Trees for Hardware Accelerated Ray Tracing of Dynamic Scenes", 2006, Graphics Hardware (2006), pp. 1-10.*

Horn et al., "Interactive k-D Tree GPU Raytracing", 2007, I3D 2007, Seattle, Washington, Apr. 30-May 2, 2007, pp. 167-174.*

Ize, "Efficient Acceleration Structures for Ray Tracing Static and Dynamic Scenes", 2009, PhD Thesis—The University of Utah, pp. 1-123.*

CN office action in corresponding CN application No. 200980163256.1 dated Apr. 1, 2014 (11 pages).

CN office action in corresponding CN application No. 200980163256.1 dated Nov. 27, 2014 (24 pages).

CN office action in corresponding CN application No. 200980163256.1 dated May 12, 2015 (6 pages).

CN office action in corresponding CN application No. 200980163256.1 dated Nov. 10, 2015 (6 pages).

CN office action in corresponding CN application No. 200980163256.1 dated Apr. 7, 2016 (7 pages).

EP office action in corresponding EP application No. 09850927.6 dated Jul. 13, 2016 (8 pages).

KR office action in corresponding KR application No. 10-2012-7013974 dated Sep. 25, 2013 (20 pages).

International Search Report and Written Opinion in corresponding International application No. PCT/RU2009/000594 dated Jul. 29, 2010 (8 pages).

Maxim Shevtsov et al., "Efficient acceleration structures layout for rendering on 32- and 64-bit many-core architectures," Proc. of GraphiCon 2009, pp. 301 and 302, Oct. 5-9, 2009.

Maxim Shevtsov et al., "Highly Parallel Fast KD-tree Construction for Interactive Ray Tracing of Dynamic Scenes," Computer Graphics Forum, vol. 26, No. 3, pp. 395-404, Oct. 12, 2007.

Cyril Crassin et al., "GigaVoxels: Ray-Guided Streaming for Efficient and Detailed Voxel Rendering," Interactive 3D Graphics and Games; Feb. 2009, pp. 15-22.

EP Office Action in corresponding EP application No. 09 850 927.6 dated Jul. 7, 2017 (5 pages).

Shevtsov, M. et al., Efficient acceleration structures layout for rendering on 32-and 64-bit many-core architectures (2 pages).

* cited by examiner

GRAPHICS RENDERING USING A HIERARCHICAL ACCELERATION STRUCTURE

BACKGROUND

This relates generally to rendering primitives during graphics processing.

An image to be processed may be analyzed in terms of primitives, such as triangles or polygons, which collectively represent the overall graphics image. In many cases, the triangles or polygons are analyzed during rasterization.

Commonly graphics primitives are searched. One common task in graphics processing is to determine which polygons or triangles are located in a given tile or frustrum. This may involve a geometrical proximity search among suitable primitives. Another example of the need for searching primitives is in ray tracing. There a closest polygon that is intersected by a ray or group of rays is identified through a search algorithm.

Rendering algorithms use acceleration structures to reduce the complexity of solving search problems. These acceleration structures may also be known as spatial or geometrical indices. Typically, they involve a hierarchical tree-like data structure storing primitives at terminal nodes. Examples of such hierarchical acceleration structures include the k dimensional tree or kd-tree, bounding volume hierarchy (BVH), bounding interval hierarchy (BIH), or binary space partition (BSP).

DETAILED DESCRIPTION

Figure 1:
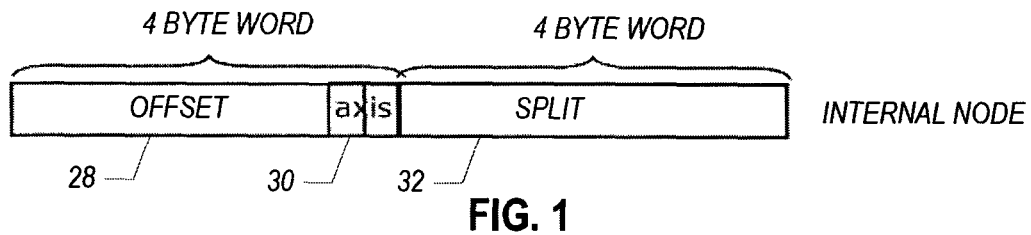
FIG. 1 is a depiction of a data structure for internal node in accordance with one embodiment.

In accordance with one embodiment, a k dimensional tree acceleration structure, or k-d tree, may be utilized. However, any other hierarchical acceleration structure may be used as well.

In k-d trees, a 3D space is divided into two non-overlapping regions according to a cost function. After a first split, each resulting region is then divided into two regions in a second split, forming two internal nodes of the k-d tree, and each of resulting four regions is then divided into two regions in a third split, forming more nodes of the k-d tree. The process continues recursively until an application specific termination criteria is met. A node that is not split anymore is called a leaf node. A leaf node stores the primitives intersecting its region. In some embodiments, a leaf stores references to primitives rather than primitives themselves. The primitive references in a leaf node are stored in a form of an array of primitive indices.

Tree based data structures have large numbers of internal nodes and references to other nodes. As a result, their memory footprint may be large and unpredictable. The computational cost of constructing such tree based data structure is high. To achieve the performance necessary for interactive graphics applications, one needs to use high speed parallel computing to create tree based structures. A compact memory layout may be achieved, in some embodiments, which reduces the amount of memory consumed. A compact representation advantageously does not slow down the traversal steps wherein the various primitives are traversed during a search operation. In addition, an acceleration structure may be stored on a disk and loaded into different address spaces. An acceleration structure may be transferred to another computing device having different address space. The representation of the acceleration structure and its data format advantageously supports the structure creation by multiple parallel threads thus enabling usage of high speed parallel computing.

In some embodiments, an acceleration structure for a model containing a large number of primitives extends into 64 bit address space of graphics processing architectures. Generally 64-bit address space requires 64-bit size references, but some embodiments may use offsets instead of pointers to reference child nodes. In that case the majority of offsets, even in large acceleration structures extending into 64-bit address space, may be encoded by 32 bits, and only a small fraction of offsets may need full 64-bit encoding. An acceleration structure may encode a special type of node that needs 64-bit offsets, the nodes of such special type are called further 64-bit extensions. Due to using 32-bit offsets by default and encoding 64-bit offsets as a special extension, an acceleration structure for a small model fitting into 32 bit address space, advantageously, has the same binary representation on 64 bit computer architectures, thus enabling the 32-bit structures to be used unchanged on 64-bit computers.

Figure 2:
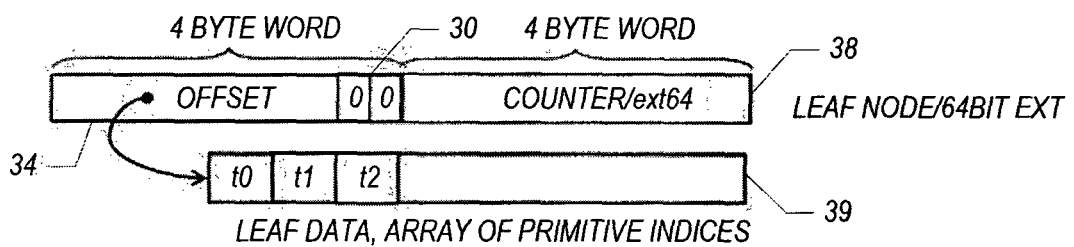
FIG. 2 is a depiction of a data structure for a leaf node or a 64 bit extension in accordance with one embodiment of the present invention.

Referring to FIGS. 1 and 2, each of the k-d tree nodes may be stored in two words that are four bytes each in one embodiment. Other word lengths may also be used. The first word of an internal node, shown in FIG. 1, is comprised of bit groups 28 and 30. The group of bits 28, shown in FIG. 1, stores an offset 34 from the word 28 and 30 to either the first byte of a child node or, in the case where the node is a leaf, to the first byte of a primitive indices array 39, as indicated in FIG. 2. By storing offsets, instead of pointers, the data structure may be independent of the base address in which it is located. As a result, storing and loading or transfer of the structure to another computing device does not necessitate pre-processing in some embodiments.

Figure 3:
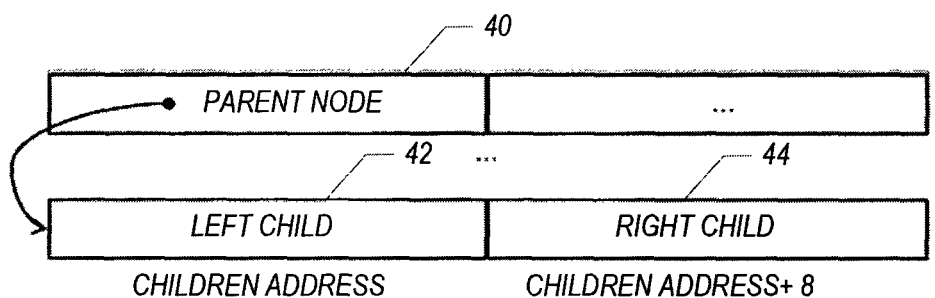
FIG. 3 is a depiction of the data structure for a parent node and its children in accordance with one embodiment.

Referring to FIG. 3, the two child nodes 42 and 44 of a parent node 40 may be stored together. This may allow storing only a single offset in the parent node, instead of two offsets in some embodiments.

Each node and the leaf indices array may be aligned by at least a four byte boundary in one embodiment. As a result, the offset between any two nodes may have at least two least significant bits equal to zero. Those two bits (group of bits 30, FIG. 1) may be used to store additional information. As indicated for the internal node (FIG. 1), the values 1, 2, and 3 in bit group 30 encode split plane positions corresponding to an x, y, or z axis. The value of the bits 30 in the leaf node, shown in FIG. 2, may be zero, so that the bit group 30 serves as a leaf node indicator.

Figure 6:
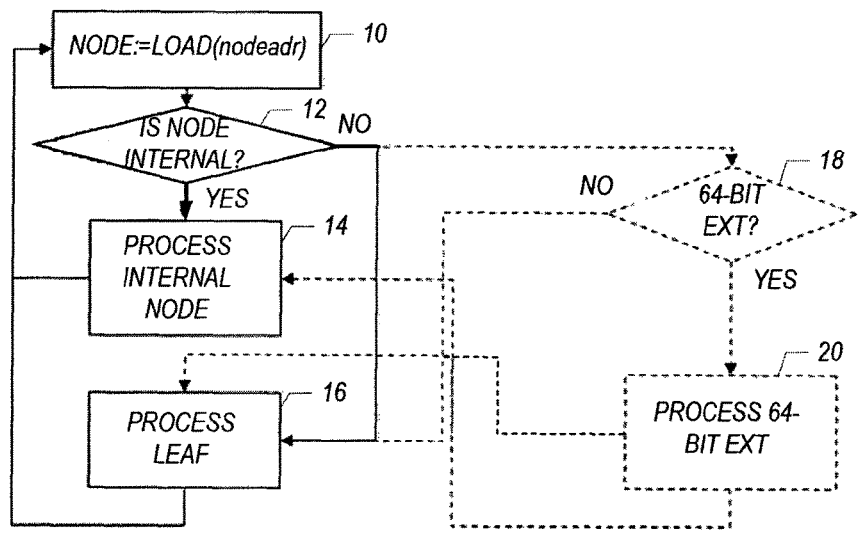
FIG. 6 is a flow chart for one embodiment of the present invention.

Referring to FIG. 6, in accordance with one embodiment, a sequence of operations may be implemented in hardware, software, or firmware. The sequence may be stored in a suitable storage device or medium in the form of stored, computer executable instructions in the case of a software or firmware embodiment. Suitable storage devices include optical or hard disk drives and semiconductor memories, to mention a few examples.

Initially, a node is accessed, as indicated in block 10. Then, in diamond 12, a check determines whether the node is internal. If so, the internal node is processed, as indicated in block 14.

If the node is not internal, then it is either a leaf node or a 64 bit extension. A 64 bit extension is a special type of node that needs a 64 bit offset to reference one of its children or both children. Of course, the present invention may be applied to extensions of any size. It is processed as a leaf, as indicated in block 16, in any case. Since a traversal algorithm visits internal nodes more frequently than leaf nodes, processing extensions in leaves rather than in internal nodes substantially reduces the number of operations that check for an extension. A check at diamond 18 determines whether the node has a 64 bit extension. If not, conventional leaf processing may be implemented. If so, a 64 bit extension is processed, as indicated in block 20, and then the flow can continue as either a leaf processing operation at block 16 or an internal node processing at block 14.

During each traversal of the flow shown in FIG. 6, the leaf/internal node test 12 is executed at each traversal step and the branch depends on its result. Having zero as a leaf indicator allows reducing the test to exactly one instruction before branch:

and Node, 0x03
jz ProcessLeaf

Figure 7:
FIG. 7 is a flow chart for another embodiment of the present invention.

To handle an unpredictability of resulting tree size, a construction algorithm may allocate memory by continuous regions. As shown in FIG. 7, in block 22, a region is initially allocated in a sequence that may be implemented in hardware or software, such as firmware, as a series of computer executable instructions stored on a computer readable storage medium. Then a check at diamond 24 determines when the region is full. If the region is full, a continuous region is allocated in block 26. The algorithm continues construction in its current region until the current region is full and then requests a new region from a memory allocation system.

Figure 5:
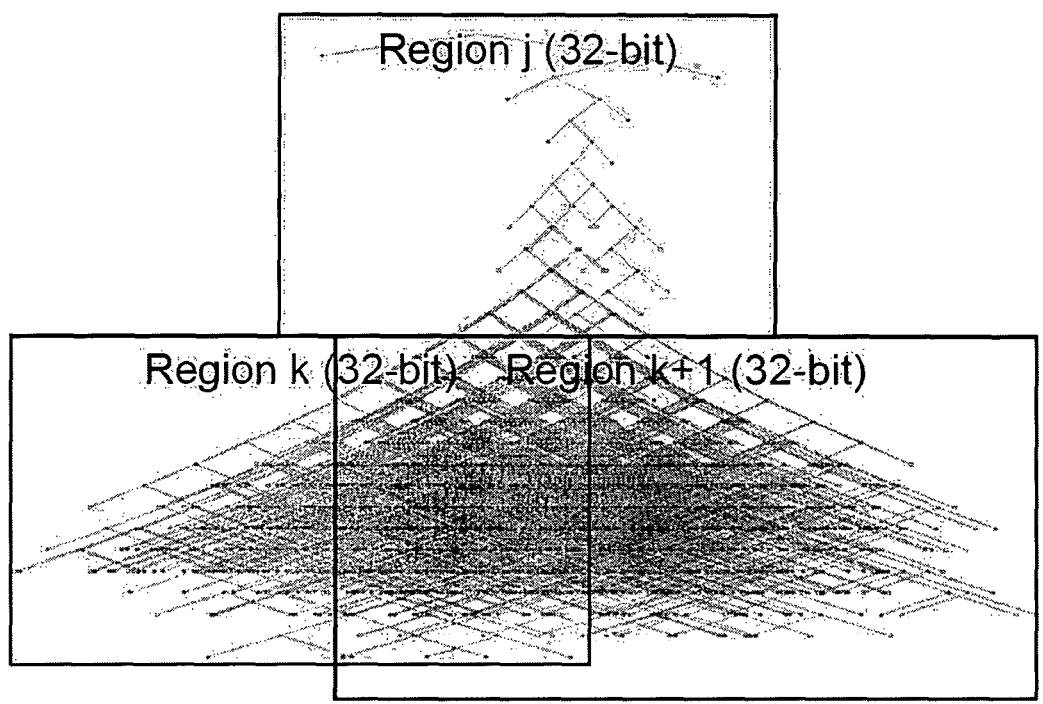
FIG. 5 is a depiction of the relationship between allocated memory regions in accordance with one embodiment.

The large connected regions (regions k, k+1, and j) of the constructed tree are located in each region, as indicated in FIG. 5. As a result, each region contains a sub-tree. In this example, when the sub-tree outgrew the region k, a continuous region k+1 was allocated.

The number of links between these sub-trees may be relatively small, in one embodiment, less than one percent of the total number of links. Thus, the number of nodes pointing to children located in another memory region is small.

As an example, a typical memory region size is less than four gigabytes. So when the tree is partitioned into sub-trees, and each sub-tree is located in a continuous region, the nodes can use 32 bit offsets to reference child nodes within the same region (e.g. region k and/or k+1). The 64 bit offsets are only used, in one embodiment, for nodes that have children located in another memory region (e.g. children in region k when parent is in region j). Since the number of such nodes is small, they may be encoded as extensions of 32 bit nodes.

As a result, the tree may be stored as a 32 bit tree with a small fraction of nodes being extended with 64 bit offsets. If a node has a 64 bit offset, an indicator is stored in axis 30 together with the node data.

To avoid testing that 64 bit extension indicator at each traversal step, the extended nodes are stored with zero in the axis 30 in FIG. 2, in one embodiment. Thus, in such an embodiment, the zero may indicate that this node is a leaf.

The traversal algorithm in FIG. 6 may then modified to test for a 64 bit extension, but only if the internal node test is not passed. Thus, any 64 bit extension node is a special type of leaf. Since the probability of traversing a leaf is very small compared to the probability of traversing internal nodes, the additional 64 bit extension test is performed at only a very small fraction of the traversal steps in some embodiments.

A second four byte word of a true leaf node stores a number of primitives at that leaf, so the value may be greater than or equal to zero. Negative values in the primitive counter indicate that the leaf is special and it is a 64 bit extended node.

In one embodiment, the tree is constructed in a top down manner from parent nodes to child nodes. When the tree is constructed in multiple threads, each thread builds a sub-tree. Thus, different threads may create a parent node and child nodes. So when a parent node is created, the offset to the child node may be unknown. That fact may prevent allocating 64 bit offset data next to a node.

Figure 4:
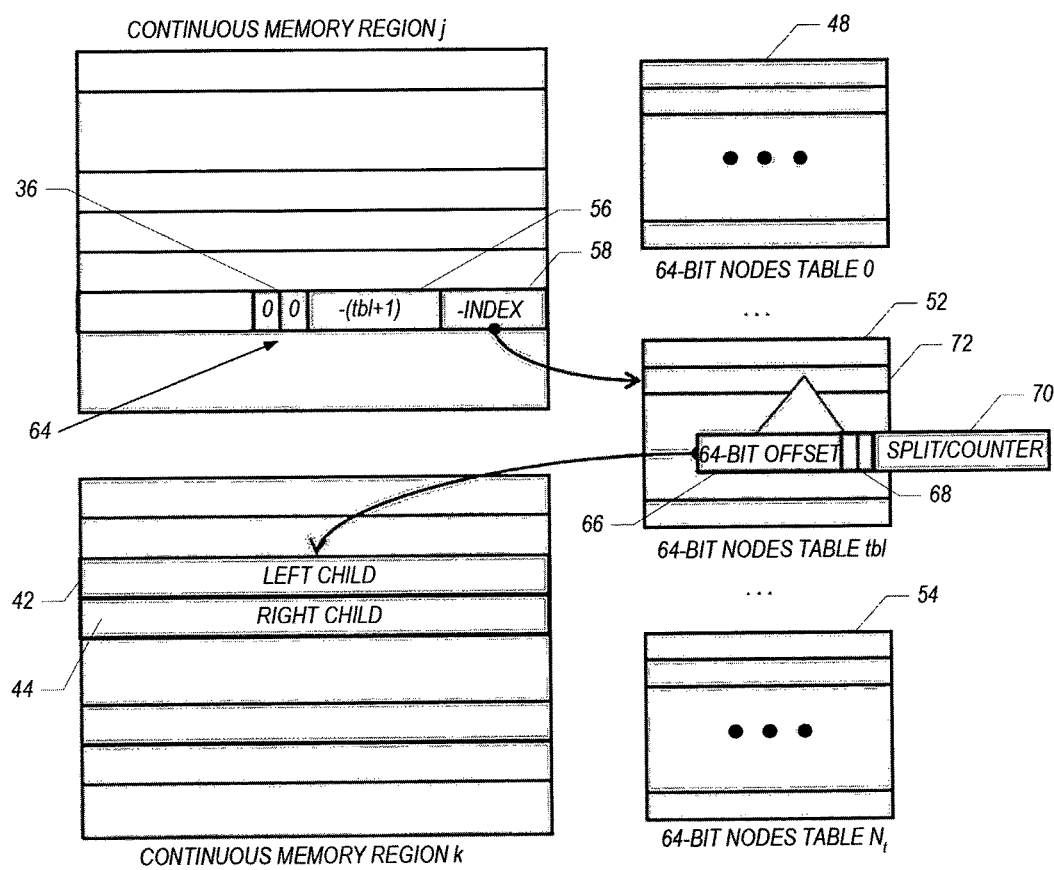
FIG. 4 shows the relationship between memory regions and node tables in accordance with one embodiment.

The 64 bit extended node data may be stored in a special table, for example, in an ext field 64, as shown in FIG. 4 in one embodiment. The 64 bit extended node data is the actual 64 bit offset 66, the actual leaf/axis 68, and the actual counter/split fields 70 in some cases.

Referring to FIG. 1, in the case of internal node, the second 4-byte word 32 of the node data is processed as a position of a splitting plane along the axis encoded at 30, that floating point value being called SPLIT. In the case of leaf node, the second word 38, shown in FIG. 2, of the node data is processed as a counter of primitives (e.g. triangles), called integer value COUNTER. In the case of 64-bit extension, COUNTER is less than 0 and it encodes the table and index containing actual node data.

In FIG. 4 (actual node data), if a node 72 is a leaf, then 70 is processed as a counter of primitives in that leaf. If a node 72 is an internal node, then 70 is processed as a split plane position. So the encoding principle for extended nodes stored in tables is the same as in main data structure except the first word is 64-bit (8 bytes) to handle 64-bit offsets. The ext field 64 may encode the negative index 58, where the index is an entry 72 in a table 52. The ext field 64 also stores the −(tbl+1) value 56, where the value of tbl is the number of the table 52. If the −(tbl+1) value 56 is located in the region j (FIG. 5), the 64 bit offset 66 may then reference children 42, 44 in region k.

Each construction thread in a multiple thread environment may create its own 64 bit node table 48, 52 or 54, as examples. So, in some embodiments, there is no contention between threads for updating tables. If the table becomes full, the corresponding thread just increases its size by reallocation and data copy. Since the table can be small, it does not affect construction performance.

Storage or transmission of a tree located in multiple memory regions may involve a compaction and reallocation of cross-region offsets in one embodiment. Since 64 bit node tables may store information on the dependent nodes and these dependent nodes are exactly nodes with cross-region references, the compaction operation may just involve a table scan and update of nodes present in the table, rather than a scan and update of all the tree nodes.

Thus, in some embodiments, only two bits are used to encode both the leaf and the internal node indicator and split plane orientation. Two least significant bits may be used for the leaf/node indicator, allowing support of negative offsets, which is helpful with implementing multi-threaded construction. A single instruction leaf/node test is possible due to special encoding of the information in those two least significant bits, in some embodiments. In some embodiments, memory may be allocated for tree nodes for multiple regions, rather than from a single continuous array. Thus, in some embodiments, 64 bit offsets are only used when needed and all other offsets are stored in 32 bit format. Special tables are used to store the nodes with 64 bit offsets. Finally, the 64 bit node may be treated as a special type of leaf.

Figure 8:
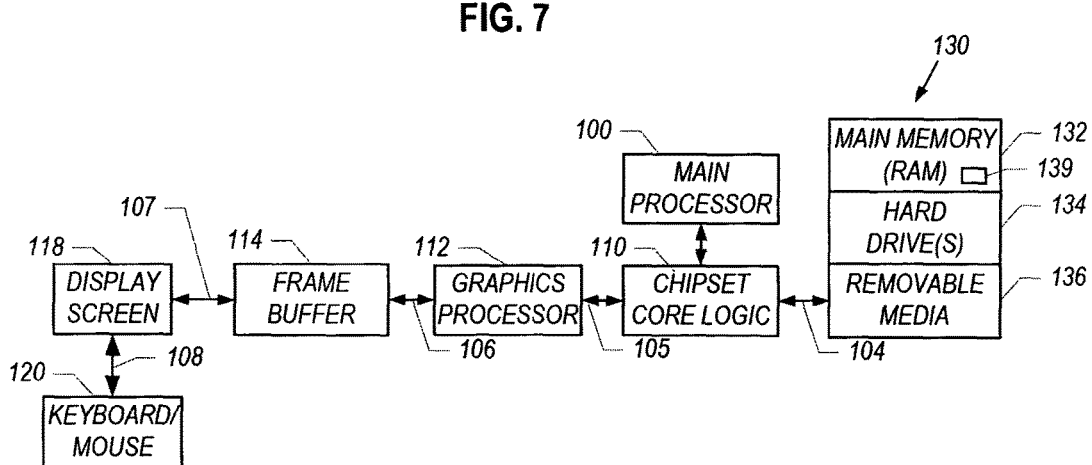
FIG. 8 is a schematic depiction of one embodiment.

A computer system 130, shown in FIG. 8, may include a hard drive 134 and a removable medium 136, coupled by a bus 104, to a chipset core logic 110. The core logic may couple to a graphics processor 112 (by a bus 105) and the main processor 100, in one embodiment. The graphics processor 112 may also be coupled by a bus 106 to a frame buffer 114. The frame buffer may be coupled by a bus 107 to a display screen 118, in turn coupled to conventional components by a bus 108, such as a keyboard or mouse 120.

In the case of a software implementation, the pertinent code may be stored in any suitable semiconductor, magnetic, or optical memory, including the main memory 132. Thus, in one embodiment, the code 139 may be stored in a machine readable medium, such as the main memory 132, for execution by a processor, such as the processor 100 or graphics processor 112.

In a software embodiment, the sequences shown in FIGS. 6 and 7, for example, may be part of the graphics processor 112. However, the sequences may also be implemented in software stored in the main memory, as indicated at 139. Of course, that software could be resident on the graphics processor 112 or any other storage device.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

The invention claimed is:

1. A method comprising:
 building, by a computing device, a hierarchical acceleration structure using a 32 bit address space format to reference child nodes;
 determining, by the computing device, whether a node in said hierarchical acceleration structure is internal and, only if the node is not an internal node, checking whether the node uses a 64 bit address space format;
 if the node uses the 64 bit address space format, processing the node as a 64 bit extension; and
 if the node does not use the 64 bit address space format, processing the node as a leaf node.

2. The method of claim 1 wherein building a hierarchical acceleration structure includes building a k-d tree.

3. The method of claim 1 including storing nodes in two four byte words.

4. The method of claim 3 including storing an offset from a word.

5. The method of claim 4 including storing an offset to the first byte of a child node.

6. The method of claim 4 wherein said node is a leaf, storing an offset to the first byte of a primitive indices array.

7. The method of claim 1 including storing at least two child nodes with a parent node.

8. The method of claim 1 including using a bit group to encode split plane positions corresponding to an x, y, or z axis.

9. The method of claim 8 including using said bit group to indicate whether a node is a leaf node.

10. The method of claim 1 including only testing for a 64 bit extension if an internal node test is not passed.

11. The method of claim 1 including allocating memory by continuous regions.

12. A non-transitory computer readable medium storing instructions for execution by a computing device to:
 build, by the computing device, a hierarchical acceleration structure using a 32 bit address space format to reference child nodes;
 determine, by the computing device, whether a node in said hierarchical acceleration structure is internal and, only if the node is not an internal node, checking whether the node uses a 64 bit address space format;
 if the node uses the 64 bit address space format, processing the node as a 64 bit extension; and
 if the node does not use the 64 bit address space format, processing the node as a leaf node.

13. The medium of claim 12 further storing instructions for execution by the computing device to only use 64 bit offsets when 64 bit offsets are needed.

14. The medium of claim 12 further storing instructions for execution by the computing device to build a hierarchical tree by building a k-d tree.

15. The medium of claim 12 further storing instructions for execution by the computing device to store nodes in two four byte words.

16. The medium of claim 15 further storing instructions for execution by the computing device to store an offset from a word.

17. The medium of claim 12 further storing instructions for execution by the computing device to store an offset to the first byte of a child node.

18. The medium of claim 12 further storing instructions for execution by the computing device to store at least two child nodes with a parent node.

19. The medium of claim 12 further storing instructions for execution by the computing device to use a bit group to encode split plane positions corresponding to an x, y, or z axis.

20. The medium of claim 19 further storing instructions for execution by the computing device to use said bit group to indicate whether a node is a leaf node.

21. The medium of claim 12 further storing instructions for execution by the computing device to allocate memory by continuous regions.

22. An apparatus comprising:
   a hardware graphics processor configured to:
      build a hierarchical acceleration structure using a 32 bit address space format to reference child nodes;
      determine whether a node in said hierarchical acceleration structure is internal and, only if the node is not an internal node, check whether the node uses a 64 bit address space format;
      if the node uses the 64 bit address space format, process the node as a 64 bit extension; and
      if the node does not use the 64 bit address space format, process the node as a leaf node; and
   a storage device coupled to said graphics processor.

23. The apparatus of claim 22 wherein said hierarchical acceleration structure includes a k-d tree.

24. The apparatus of claim 22 wherein said graphics processor is further configured to only test for a 64 bit extension if an internal node test is not passed.

25. The apparatus of claim 22 wherein said graphics processor is further configured to allocate memory by continuous regions.

26. The apparatus of claim 22, wherein said graphics processor is further configured to use a bit group to indicate whether a node is a leaf node.

\* \* \* \* \*